(12) United States Patent
House

(10) Patent No.: US 7,689,168 B2  
(45) Date of Patent: Mar. 30, 2010

(54) REMOTE USER INTERFACE FOR BLUETOOTH™ DEVICE

(75) Inventor: Christopher House, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 573 days.

(21) Appl. No.: 11/277,959

(22) Filed: Mar. 30, 2006

(65) Prior Publication Data

US 2007/0238411 A1    Oct. 11, 2007

(51) Int. Cl.  
H04B 7/00    (2006.01)

(52) U.S. Cl. .................. 455/41.2; 455/566; 455/39; 455/571

(58) Field of Classification Search ........... 455/41.2, 455/411, 569.1, 566, 573, 39, 571, 572, 574, 455/154.2  
See application file for complete search history.

(56) References Cited

U.S. PATENT DOCUMENTS

| | | | |
|---|---|---|---|
| 6,791,473 B2 | 9/2004 | Kibria et al. | |
| 2003/0054794 A1 | 3/2003 | Zhang | |
| 2003/0099207 A1* | 5/2003 | Yamato | 370/280 |
| 2003/0137954 A1 | 7/2003 | Yokoyama | |
| 2004/0180701 A1* | 9/2004 | Livet et al. | 455/574 |
| 2005/0058109 A1* | 3/2005 | Ekberg | 370/338 |
| 2006/0024231 A1 | 2/2006 | Schnitzer et al. | |
| 2006/0036733 A1 | 2/2006 | Fujimoto et al. | |
| 2006/0116107 A1* | 6/2006 | Hulvey | 455/411 |
| 2006/0135218 A1* | 6/2006 | Son et al. | 455/573 |
| 2006/0212938 A1* | 9/2006 | Suzuki | 726/16 |

FOREIGN PATENT DOCUMENTS

| | | |
|---|---|---|
| EP | 1376319 | 1/2004 |
| WO | 01/37262 | 5/2001 |

OTHER PUBLICATIONS

Sony Ericsson Mobile Communications AB, International Application No. PCT/US2006/060471, "International Search Report", Apr. 4, 2007.

(Continued)

*Primary Examiner*—Tuan A Pham  
(74) *Attorney, Agent, or Firm*—R. Brian Drozd; Moore & Van Allen PLLC (57) ABSTRACT

A system and method of displaying data pertaining to an accessory on a mobile device is disclosed. The accessory and the mobile device are communicable with one another using the Bluetooth™ protocol. A set of pre-defined Bluetooth queries using an extended list of AT commands that can be used by the Bluetooth protocol are designed to perform functions that request data pertaining to the accessory. A Bluetooth connection is established between the accessory and the mobile device. A Bluetooth query is selected by a user of the mobile device and sent to the accessory. The accessory receives and executes the Bluetooth query from the mobile device to obtain the requested data pertaining to the accessory. The requested data is sent back to the mobile device where it is displayed on the mobile device display.

6 Claims, 6 Drawing Sheets

OTHER PUBLICATIONS

Sony Ericsson Mobile Communications AB, International Application No. PCT/US2006/060471, "Written Opinion", Apr. 4, 2007.
Sony Ericsson Mobile Communications AB, International Application No. PCT/US2006/60471, International Search Report, Oct. 25, 2007.
Sony Ericsson Mobile Communications AB, International Application No. PCT/US2006/60471, Written Opinion, Oct. 25, 2007.
International Preliminary Report on Patentability, corresponding to International Patent Application No. PCT/US2006/060471, dated Jul. 9, 2008.

* cited by examiner

REMOTE USER INTERFACE FOR BLUETOOTH™ DEVICE

BACKGROUND OF THE INVENTION

The present invention relates to accessories that are wirelessly compatible with a portable mobile communications device, and more particularly to a portable mobile communications device that can display information pertaining to a wireless accessory that does not have display means of its own.

Due to size and power limitations it is not practical to include a display with every wireless accessory that is in communication with a mobile device such as a mobile phone. The mobile device, however, does have a sophisticated user interface and display that can be used to provide information pertaining to the wireless accessory. What is needed is a system in which the mobile device and the wireless accessory can be linked such that the mobile device supports specific queries to the wireless accessory. The replies to the queries can then be displayed by the mobile device for the benefit of the user.

BRIEF SUMMARY OF THE INVENTION

The present invention describes a mobile device capable of displaying data pertaining to an accessory. The accessory and the mobile device are communicable with one another using the Bluetooth™ protocol. The mobile device includes a display, a processor coupled with the display, and a user interface coupled with the processor. The mobile device further includes a Bluetooth module. The Bluetooth module is used to establish a Bluetooth connection between the accessory and the mobile device, send a Bluetooth query to the accessory, and receive data over the Bluetooth connection from the accessory in response to the sent Bluetooth query. To assist in these functions the mobile device also includes a Bluetooth query application coupled with the Bluetooth module, the processor, and the user interface. The Bluetooth query application includes a set of pre-defined Bluetooth queries using an extended list of AT commands that can be used by the Bluetooth protocol. The set of Bluetooth queries perform functions that request data pertaining to the accessory. The Bluetooth query application aids in selecting, via the user interface, a Bluetooth query associated with AT commands from the extended list of AT commands and displaying the received data pertaining to the accessory on the display.

The accessory is capable of sending data pertaining to itself to the mobile device using the Bluetooth™ protocol. The accessory also includes its own Bluetooth module for establishing a Bluetooth connection between the accessory and the mobile device. The accessory receives the Bluetooth query from the mobile device and executes the AT commands associated with the received Bluetooth query to obtain the requested data pertaining to the accessory. The requested data is then sent over the Bluetooth connection back to the mobile device in response to the received Bluetooth query.

In another embodiment, the mobile device and the accessory will determine if asynchronous connection-less (ACL) service is required. If ACL service is required then a logical link and adaptation (L2CAP) connection is established. Once L2CAP is established, the user can use the mobile device user interface (UI) to select for execution a query pertaining to the accessory. Once selected, the mobile device sends the selected query via the L2CAP link (or a higher application link) to the accessory. The accessory receives and executes the query and returns the result of the query to the mobile device using the same link (L2CAP or higher) on which it was received. The mobile device receives the reply from the previous Bluetooth query and displays the data results on its display.

DETAILED DESCRIPTION OF THE INVENTION

The present invention provides a mechanism for a Bluetooth™ accessory that may not possess its own display means to display pertinent data about itself using a mobile device that does have a display and more robust user interface. The general idea is to establish a set of queries using the established Bluetooth™ protocol invocable from the mobile device to ascertain data from the Bluetooth™ accessory and display it on the mobile device. The mobile device can be a Bluetooth™ enabled mobile phone, personal digital assistant (PDA), personal computer (PC), television, or other Bluetooth™ enabled device with display means. The Bluetooth™ accessory can be a headset, an automobile hands-free accessory, a media transmission accessory, or other Bluetooth™ accessory that lacks a display means.

For purposes of illustration, the present invention and its various embodiments are described using a Bluetooth™ enabled mobile phone as the mobile device and a Bluetooth™ enabled portable headset as the accessory.

Figure 1:
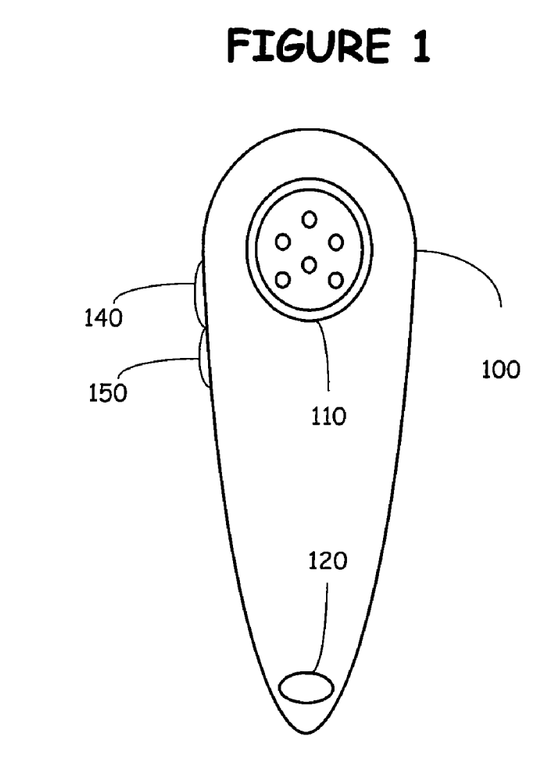
FIG. 1 is a block diagram front view of a typical Bluetooth™ headset accessory.

FIG. 1 is a block diagram front view of a typical Bluetooth™ headset accessory 100. There is a speaker component 110 and a microphone component 120. On the side of the headset accessory 100 are volume buttons 140 and 150 to control the volume of the speaker 110.

Figure 2:
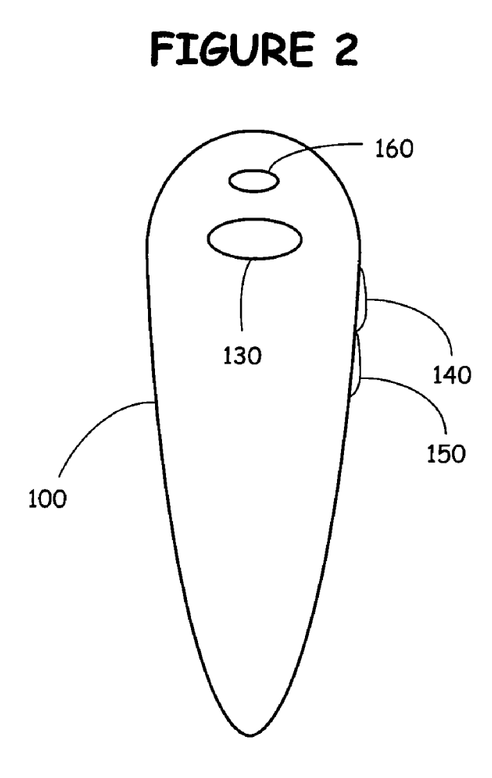
FIG. 2 is a block diagram back view of the Bluetooth™ headset accessory in FIG. 1.

FIG. 2 is a block diagram back view of the Bluetooth™ headset accessory 100 in FIG. 1. In this view, there is a power/control button 130 that serves to power the headset accessory 100 up and down as well as control certain functions. Just above the power/control button 130 is a small light emitting diode (LED) 160 used to indicate whether the headset accessory 100 is powered on. Typically a green light will indicate that the headset accessory 100 is powered on. The volume buttons 140 and 150 are again visible on the side of the headset accessory 100.

Figure 3:
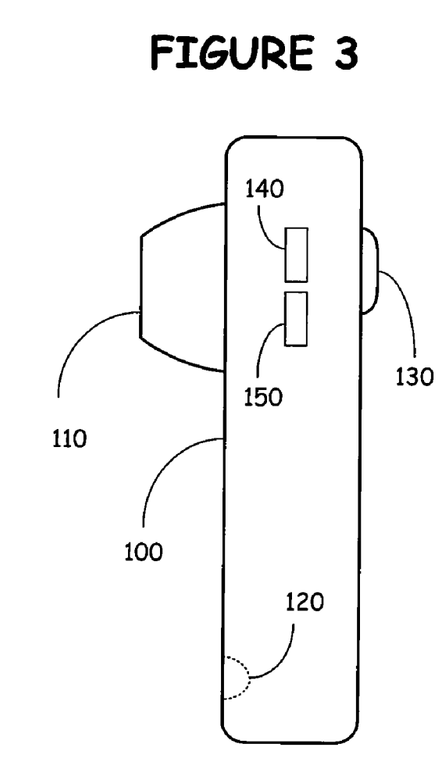
FIG. 3 is a block diagram side view of the Bluetooth™ headset accessory in FIG. 1.

FIG. 3 is a block diagram side view of the Bluetooth™ headset accessory 1 00 in FIG. 1. In this view the speaker component 110 protrudes from the front of the headset accessory 100 such that it can be comfortably placed within an ear. The microphone component 120 is shown as a dotted outline since it is actually housed within the headset accessory 100. Also visible is the power/control button 130 and the volume buttons 140 and 150.

Conspicuously absent in any of FIGS. 1-3 is a display means. The headset accessory 100 is incapable of providing status information to the user without outside assistance. There is only so much useful information the user can glean from observing the LED.

Figure 4:
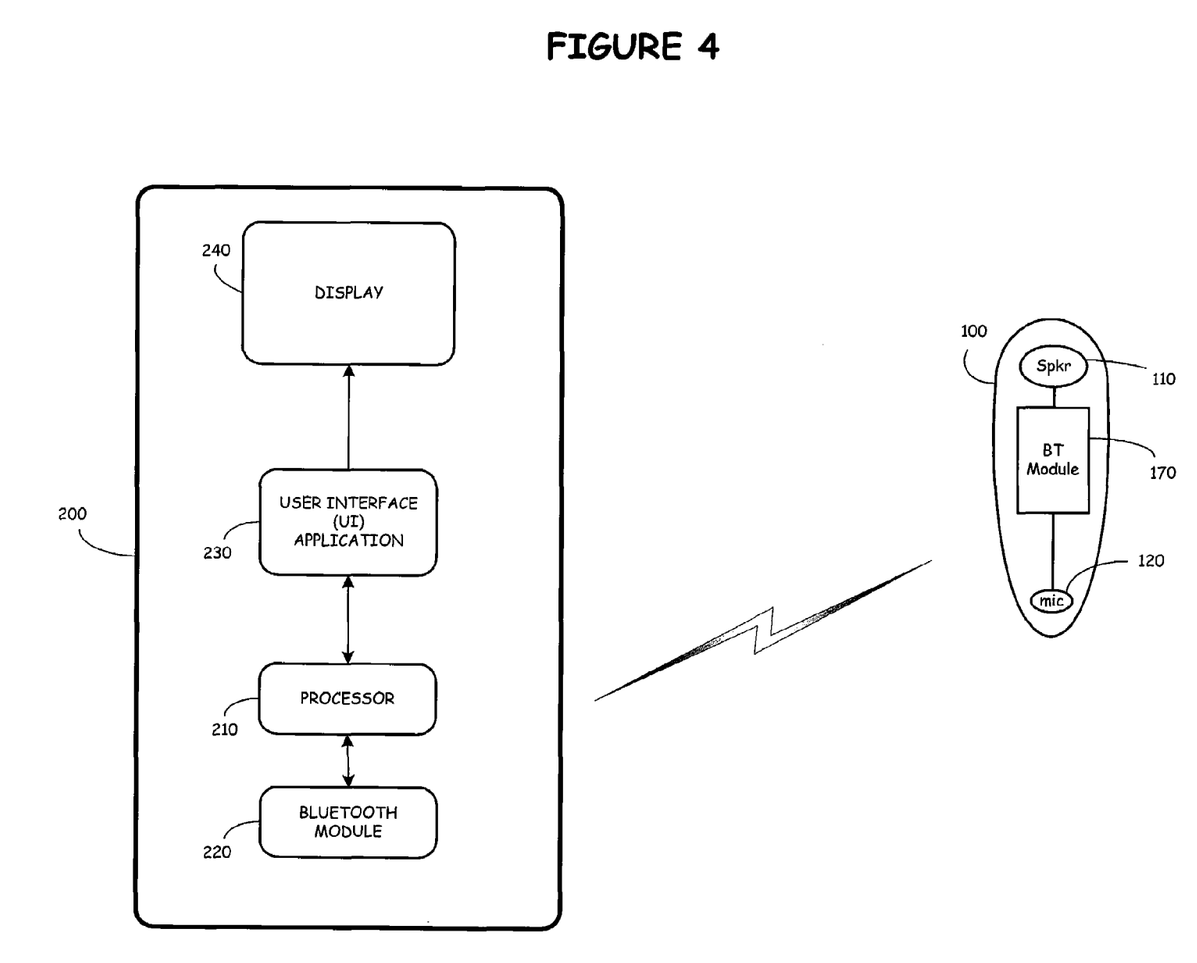
FIG. 4 is a block diagram of the components within a mobile device in communication with a Bluetooth™ headset accessory.

FIG. 4 is a block diagram of the components within a mobile device 200 in communication with a Bluetooth™ headset accessory 100. The mobile device 100, a mobile phone in this case, includes a processor 210, a Bluetooth™ module 220, a user interface application 230, and a display 240 in addition to the other components that comprise a mobile phone. The headset accessory 100 includes the speaker 110 and the microphone 120 coupled with a Bluetooth™ module 170. The Bluetooth™ module 170 can contain its own processor to manage signals and data it transmits and receives according to the Bluetooth™ specification.

Figure 5:
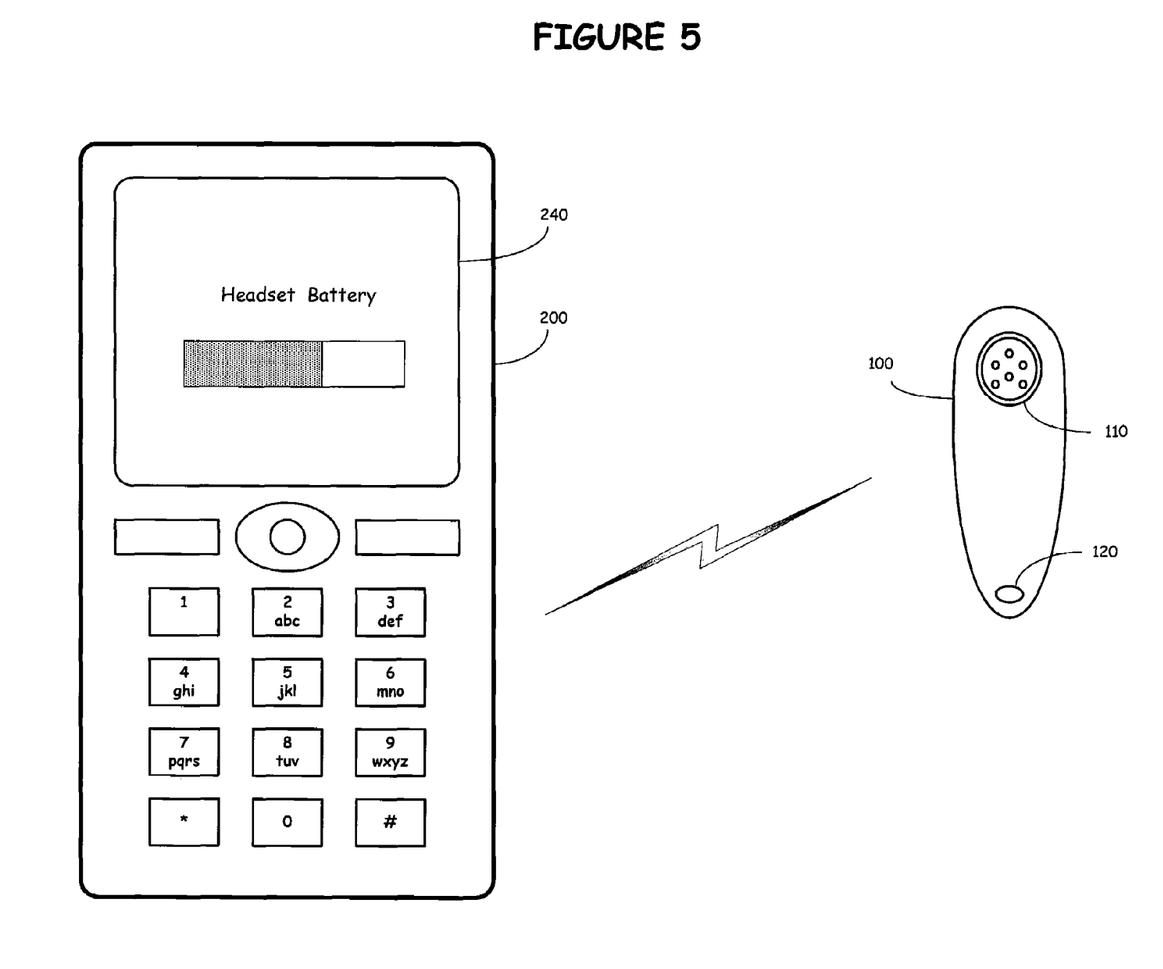
FIG. 5 illustrates a mobile device in communication with a Bluetooth™ headset accessory.

FIG. 5 illustrates a mobile device in communication with a Bluetooth™ headset accessory. This figure illustrates an example of a screen display on the mobile device 200 following a user query as to the battery status on the headset accessory 100. The mobile device display 240 displays a picture of a battery that is partially shaded to indicate the remaining battery life on the headset accessory 100. The headset accessory 100 itself is incapable of providing such a visual cue to the user.

The present invention uses the existing Bluetooth™ specification and an extended set of AT commands to query the headset accessory. Results of the query are relayed back to the mobile device for processing and display on the mobile device display.

Figure 6:
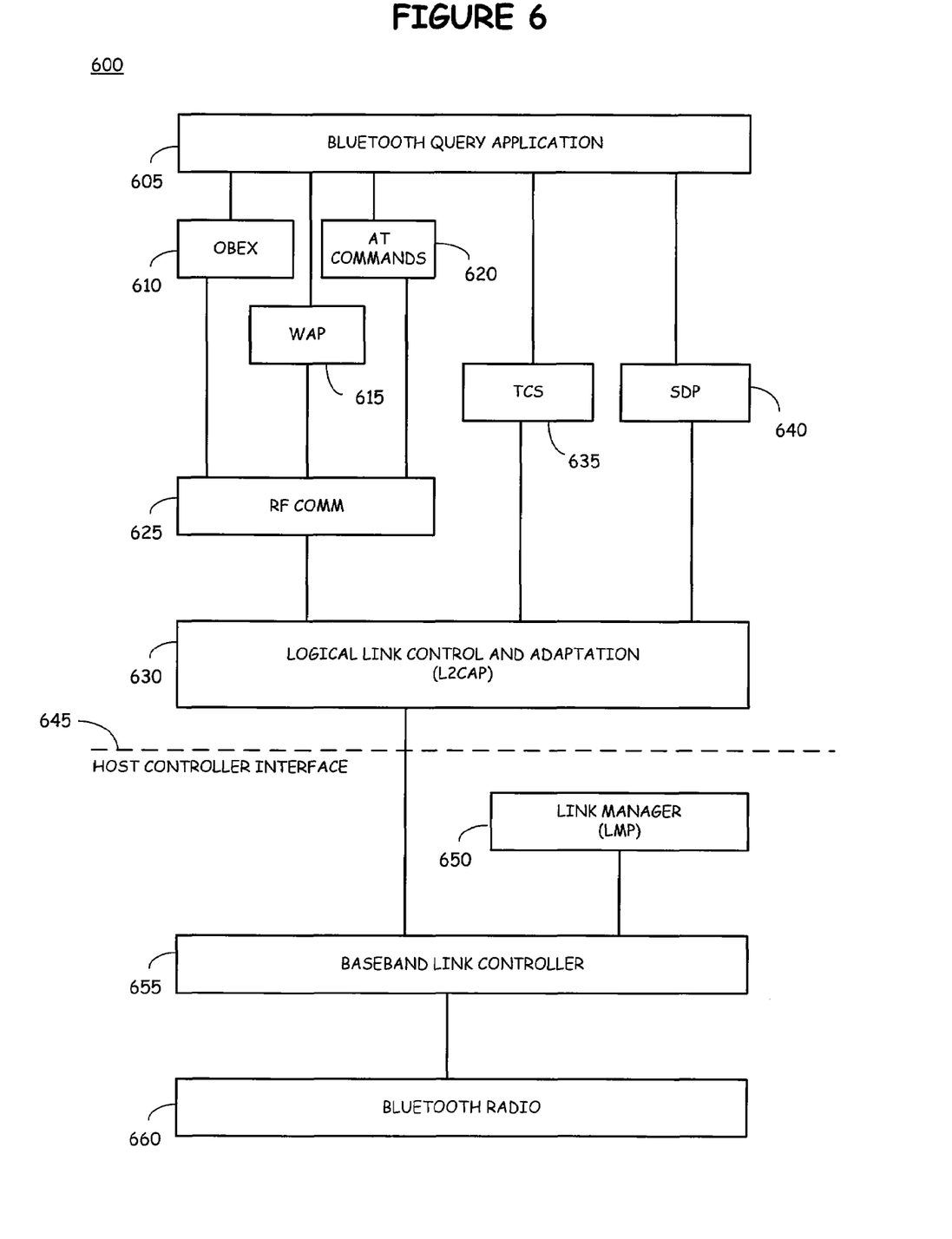
FIG. 6 is a block diagram of the Bluetooth™ protocol stack.

FIG. 6 is a block diagram of the Bluetooth™ protocol stack 600. At the top of the stack is a host application which in the present invention is termed the "Bluetooth Query Application" 605. The next level of the stack includes the object exchange protocol (OBEX) 610, the wireless applications protocol (WAP) 615, and the AT command set 620.

Each of the above feed into the RFCOMM 625 which is a serial cable emulation protocol. The RFCOMM 625 protocol provides emulation of serial ports over the L2CAP protocol 630. RFCOMM is a simple transport protocol, with additional provisions for emulating the 9 circuits of RS-232 (EIA-TIA-232-E) serial ports. The RFCOMM protocol supports up to 60 simultaneous connections (RFCOMM channels) between two Bluetooth devices. For the purposes of RFCOMM, a complete communication path involves two applications running on different devices (the communication endpoints) with a communication segment between them. RFCOMM is intended to cover applications that make use of the serial ports of the devices in which they reside. The communication segment is a Bluetooth link from one device to another also known as a direct connect.

Also at this layer are the telephone control specification (TCS) protocol 635 and the service discovery protocol (SDP) 640. The Service Discovery Protocol (SDP) 640 provides the means for client applications to discover the existence of services provided by server applications as well as the attributes of those services. The attributes of a service include the type or class of service offered and the mechanism or protocol information needed to utilize the service. SDP 640 involves communication between a SDP server and a SDP client. The server maintains a list of service records that describe the characteristics of services associated with the server. Each service record contains information about a single service. A client may retrieve information from a service record maintained by the SDP server by issuing a SDP request. If the client, or an application associated with the client, decides to use a service, it must open a separate connection to the service provider in order to utilize the service. SDP 640 provides a mechanism for discovering services and their attributes, but it does not provide a mechanism for utilizing those services.

The next layer is the previously mentioned logical link control and adaptation protocol (L2CAP) 630. The L2CAP protocol 630 supports higher level protocol multiplexing, packet segmentation and reassembly, and the conveying of quality of service information. L2CAP is based around the concept of channels. A channel is a logical connection on top of a baseband connection. Each channel is bound to a single protocol in a many-to-one fashion. Multiple channels can be bound to the same protocol, but a channel cannot be bound to multiple protocols. Each L2CAP packet received on a channel is directed to the appropriate higher level protocol. Multiple channels can share the same baseband connection. The L2CAP layer is normally connected to the Bluetooth host controller interface (HCI) layer 645 downstream and Bluetooth socket layers such as RFCOMM 625, TCS 635, and SDP 640 upstream.

The host controller interface (HCI) layer 645 provides a command interface to the baseband link controller layer 655 and link manager 650, and access to hardware status and control registers. This interface provides a uniform method of accessing the Bluetooth baseband capabilities.

The next layer down is the link manager protocol (LMP) 650. The Link Manager software entity carries out link setup, authentication, link configuration, and other protocols. The LMP 650 is used for link setup and control. LMP PDU signals are interpreted and filtered out by the Link Manager on the receiving side and are not propagated to higher layers.

The next layer is the baseband link controller layer 655 which controls the lowest level of the Bluetooth stack, the radio 660.

Figure 7:
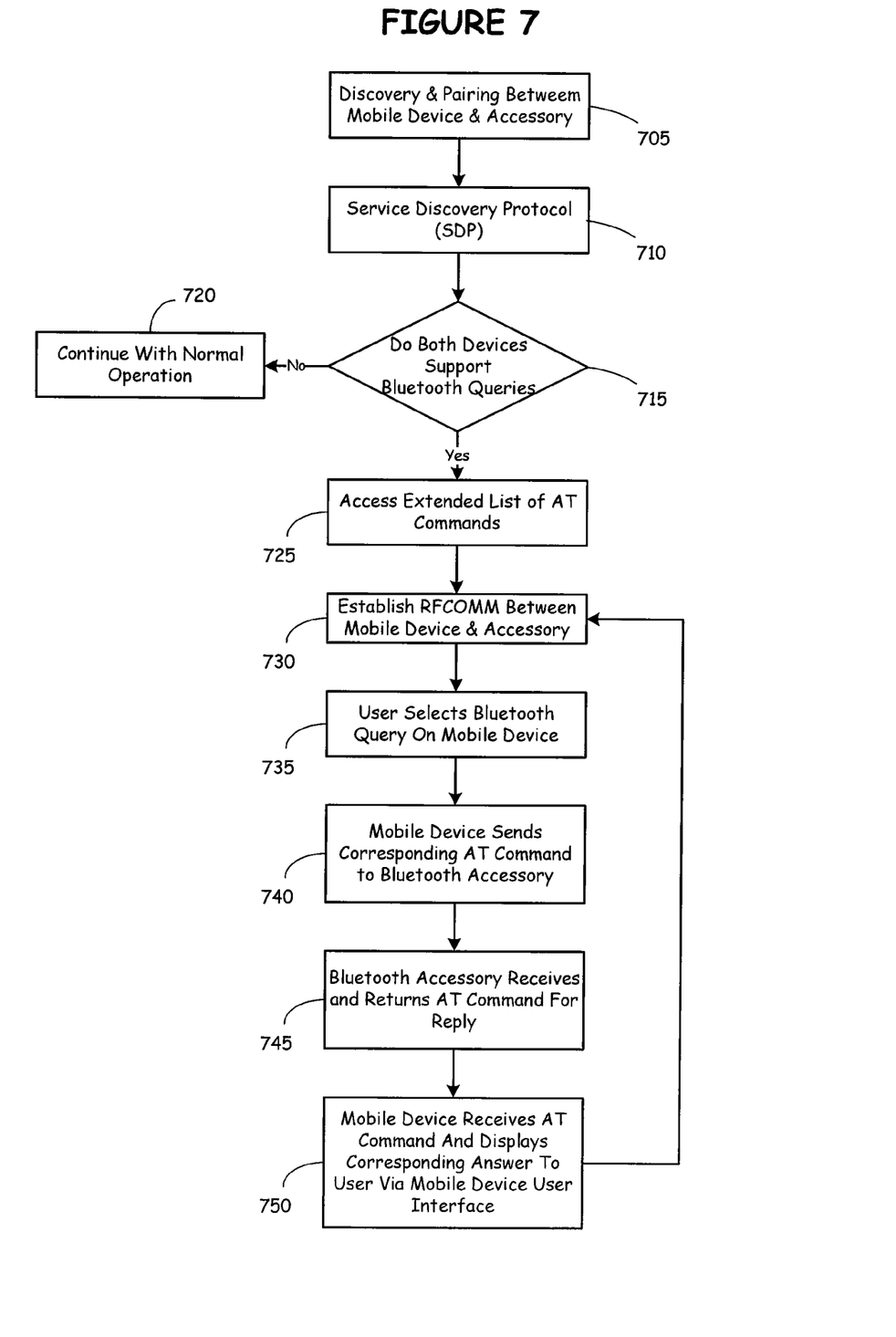
FIG. 7 is a flowchart describing the process of displaying Bluetooth™ accessory data on a mobile device according to one embodiment of the present invention.

FIG. 7 is a flowchart describing the process of displaying Bluetooth™ accessory data on a mobile device according to one embodiment of the present invention. The first step in the process requires the Bluetooth™ enabled mobile device and the Bluetooth™ accessory to discover and connect 705 with one another. This is termed pairing in the Bluetooth™ specification. Once paired the service discovery protocol (SDP) is used 710 to determine what services or applications each device has in common. If both devices do not support the Bluetooth Query Application 715 then the pairing of the devices will continue as normal 720 without any Bluetooth query capabilities. Otherwise, the mobile device and the accessory will access the extended list of AT commands 725 that are coded into and specific to the Bluetooth Query Application. These AT commands provide the low level instruction set used to carry out higher level functions defined by the Bluetooth Query Application. The next step is to establish RFCOMM between the mobile device and the accessory 730. Once established, the user can use the mobile device user interface (UI) to select for execution a query pertaining to the accessory 735. Once selected, the mobile device sends the appropriate AT command to the accessory 740. The accessory receives and executes the AT command gathering the requested data before returning the requested data back to the mobile device 745. The mobile device receives the reply from the previous Bluetooth query and displays the data results on its display 750.

The extended set of AT commands can be coded to obtain and return results for a variety of queries. For instance, a visual graphical indication of remaining battery life on the accessory can be determined. A visual graphical indication of signal strength between the mobile device and accessory can also be displayed. Commands to connect or pair the accessory with a third Bluetooth™ device can also be carried out using the mobile device as a proxy. This would allow the mobile device to, in effect, remotely control the accessory. The mobile device can command the accessory to emit an audible tone or beep. This would be helpful in trying to locate a misplaced accessory that is close enough to be in Bluetooth™ communication with the mobile device. The mobile device can also query the accessory as to its functional capabilities such as "auto answer" for a headset accessory.

The preceding list of Bluetooth queries that are executed using the extended set of AT commands is by no means an exhaustive list. The number and type of possible Bluetooth queries is limited only by the accessory itself. Thus, a person skilled in the art practicing the present invention can readily devise and implement additional Bluetooth queries without departing from the scope of the invention.

Figure 8:
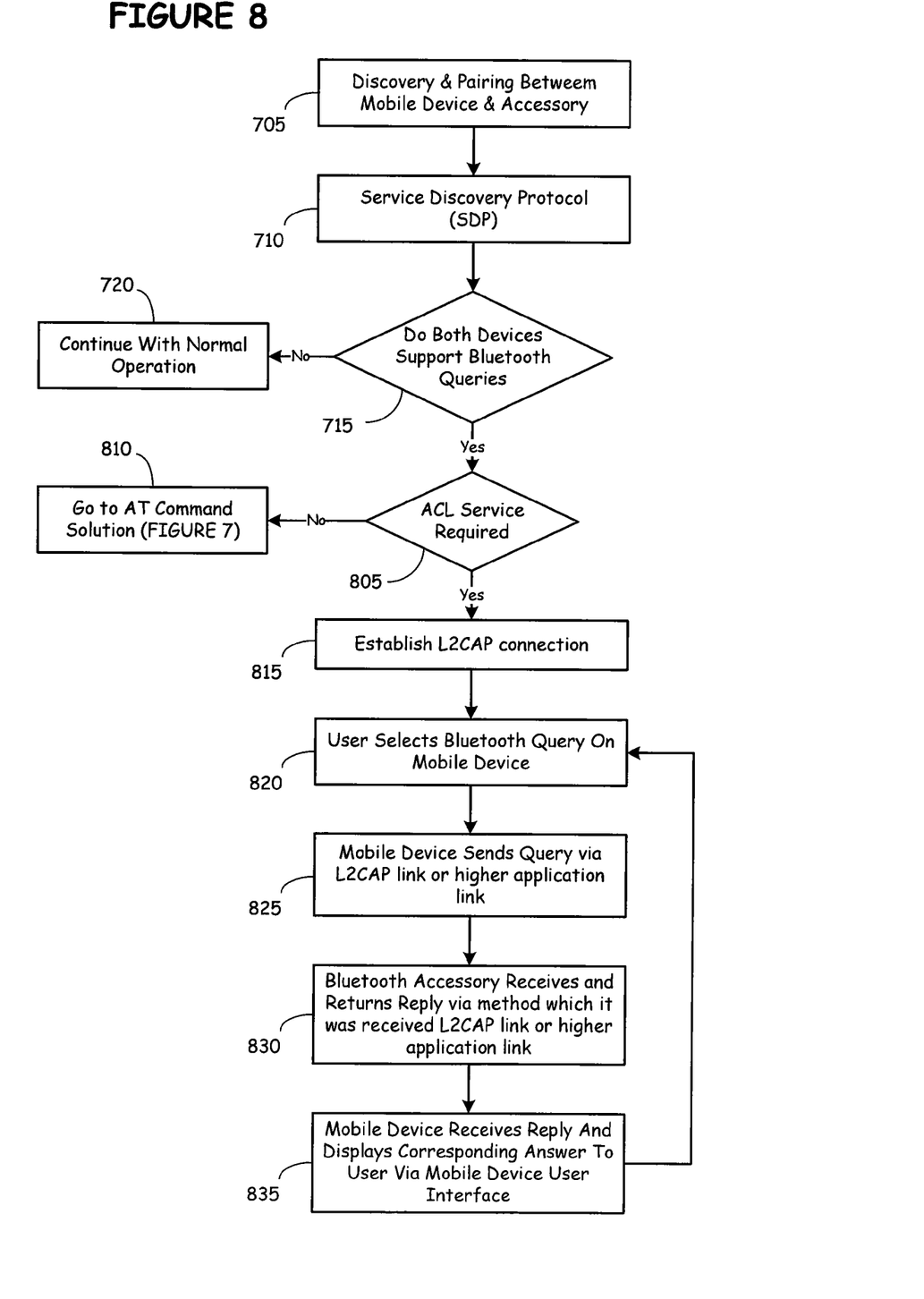
FIG. 8 is a flowchart describing the process of displaying Bluetooth™ accessory data on a mobile device according to another embodiment of the present invention.

FIG. 8 is a flowchart describing the process of displaying Bluetooth™ accessory data on a mobile device according to another embodiment of the present invention. Just as in FIG. 7 above, the first step in the process requires the Bluetooth™ enabled mobile device and the Bluetooth™ accessory to discover and connect 705 with one another. Once paired the service discovery protocol (SDP) is used 710 to determine what services or applications each device has in common. If both devices do not support the Bluetooth Query Application 715 then the pairing of the devices will continue as normal 720 without any Bluetooth query capabilities. Otherwise, the mobile device and the accessory will determine if asynchronous connection-less (ACL) service is required 805. If ACL service is not required then processing will occur according to the AT command solution 810 of FIG. 7. Otherwise, the L2CAP connection is established 815. Once L2CAP is established, the user can use the mobile device user interface (UI) to select for execution a query pertaining to the accessory 820. Once selected, the mobile device sends the selected query via the L2CAP link (or a higher application link) to the accessory 825. The accessory receives and executes the query and returns the result of the query to the mobile device using the same link (L2CAP or higher) on which it was received 830. The mobile device receives the reply from the previous Bluetooth query and displays the data results on its display 835.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of displaying data pertaining to an accessory on a mobile device, the accessory and the mobile device being communicable with one another using the Bluetooth™ protocol, the method comprising:
    creating a set of pre-defined Bluetooth queries using an extended list of AT commands that are compatible with and can be used by the Bluetooth protocol, the set of Bluetooth queries for performing functions that request data pertaining to the accessory;
    establishing a Bluetooth connection between the accessory and the mobile device;
    receiving input of a selection of a Bluetooth query associated with AT commands from the extended list of AT commands;
    sending the Bluetooth query to the accessory requesting data pertaining to the accessory;
    receiving the requested data over the Bluetooth connection from the accessory in response to the sent Bluetooth query;
    displaying the received data pertaining to the accessory on the mobile device display; and
    determining whether an asynchronous connection-less (ACL) service is required and establishing a logical link control and adaptation (L2CAP) connection with the accessory when an ACL service is required allowing a user interface on the mobile device to be used to select for execution a query displaying the data pertaining to the accessory and send the query via the L2CAP link to the accessory.

2. A mobile device capable of displaying data pertaining to an accessory, the accessory and the mobile device being communicable with one another using the Bluetooth™ protocol, the mobile device comprising:
    a display;
    a processor coupled with the display;
    a user interface coupled with the processor;
    a Bluetooth module for:
        establishing a Bluetooth connection between the accessory and the mobile device;
        sending a Bluetooth query to the accessory requesting data pertaining to the accessory;
        receiving data over the Bluetooth connection from the accessory in response to the sent Bluetooth query, and
    a Bluetooth query application coupled with the Bluetooth module, the processor, and the user interface, the Bluetooth query application including a set of pre-defined Bluetooth queries using an extended list of AT commands that can be used by the Bluetooth protocol, the set of Bluetooth queries for performing functions that request data pertaining to the accessory, the Bluetooth query application for:
        receiving input of a selection via the user interface of a Bluetooth query associated with AT commands from the extended list of AT commands;
        displaying the received data pertaining to the accessory on the display; and
        determining whether an asynchronous connection-less (ACL) service is required and establishing a logical link control and adaptation (L2CAP) connection with the accessory when an ACL service is required allowing a user interface on the mobile device to be used to select for execution a query displaying the data pertaining to the accessory and send the query via the L2CAP link to the accessory.

3. A method of displaying data pertaining to an accessory on a mobile device, the accessory and the mobile device being communicable with one another using the Bluetooth™ protocol, the method comprising:
    creating a set of pre-defined Bluetooth queries that are compatible with and can be used by the Bluetooth protocol, the set of Bluetooth queries for performing functions that request data pertaining to the accessory;
    establishing a Bluetooth connection between the accessory and the mobile device;
    receiving input of a selection of a Bluetooth query;
    determining whether an asynchronous connection-less (ACL) service is required and establishing a logical link control and adaptation (L2CAP) connection with the accessory when an AOL service is required allowing a user interface on the mobile device to be used to select for execution a query displaying the data pertaining to the accessory;
    sending the Bluetooth query to the accessory requesting data pertaining to the accessory;
    receiving the requested data over the Bluetooth connection from the accessory in response to the sent Bluetooth query; and
    displaying the received data pertaining to the accessory on the mobile device display.

4. The method of claim 3 wherein the Bluetooth query is sent to the accessory over the logical link control and adaptation (L2CAP) layer of the Bluetooth protocol stack when an ACL service is required.

5. A mobile device capable of displaying data pertaining to an accessory, the accessory and the mobile device being communicable with one another using the Bluetooth™ protocol, the mobile device comprising:

a display;
a processor coupled with the display;
a user interface coupled with the processor;
a Bluetooth module for:
   establishing a Bluetooth connection between the accessory and the mobile device;
   sending a Bluetooth query to the accessory requesting data pertaining to the accessory;
   receiving data over the Bluetooth connection from the accessory in response to the sent Bluetooth query, and
a Bluetooth query application coupled with the Bluetooth module, the processor and the user interface, the Bluetooth query application including a set of pre-defined Bluetooth queries that are compatible with and can be used by the Bluetooth protocol, the set of Bluetooth queries for performing functions that request data pertaining to the accessory, the Bluetooth query application for:

receiving input of a selection via the user interface of a Bluetooth query;
displaying the received data pertaining to the accessory on the display; and
determining whether an asynchronous connection-less (ACL) service is required and establishing a logical link control and adaptation (L2CAP) connection with the mobile device when an ACL service is required allowing a user interface on the mobile device to be used to select for execution a query displaying the data pertaining to the accessory.

6. The mobile device of claim 5 wherein the Bluetooth query is sent to the accessory over the logical link control and adaptation (L2CAP) layer of the Bluetooth protocol stack when an ACL service is required.

* * * * *

UNITED STATES PATENT AND TRADEMARK OFFICE
CERTIFICATE OF CORRECTION

PATENT NO. : 7,689,168 B2  Page 1 of 1
APPLICATION NO. : 11/277959
DATED : March 30, 2010
INVENTOR(S) : Christopher House It is certified that error appears in the above-identified patent and that said Letters Patent is hereby corrected as shown below:

Column 8, line 49, please delete "AOL" and insert in place thereof --ACL--

Signed and Sealed this

First Day of June, 2010

David J. Kappos
*Director of the United States Patent and Trademark Office*